Figure 1:
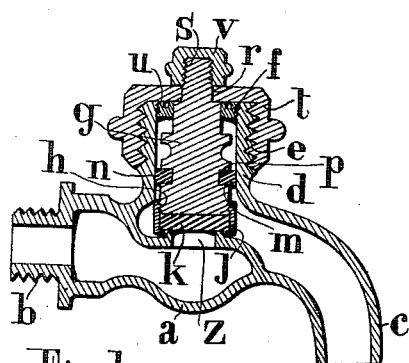

J. T. GARRATT.
VALVE AND COCK.
APPLICATION FILED AUG. 21, 1909.

995,247.

Patented June 13, 1911.

Witnesses.
B. B. Collings.
Jas. E. Dodge.

Inventor
J. T. Garratt
Wilkinson, Fisher & Witherspoon,
Attorneys.

UNITED STATES PATENT OFFICE.

JAMES THOMAS GARRATT, OF CAMBERWELL, LONDON, ENGLAND.

VALVE AND COCK.

995,247.  Specification of Letters Patent.  Patented June 13, 1911.

Application filed August 21, 1909. Serial No. 514,065.

*To all whom it may concern:*

Be it known that I, JAMES THOMAS GARRATT, a subject of the King of England, residing at 33 Leipsic road, Camberwell, in the county of London, England, have invented new and useful Improvements in Valves and Cocks, of which the following is a specification.

This invention relates to improvements in valves and cocks of the kind known as screwdown for water, steam and the like.

The invention refers to that type of such valves and cocks wherein the valve is formed or fitted at the bottom of a sliding spindle, operated by a screw cap, separate from such spindle.

Figure 2:
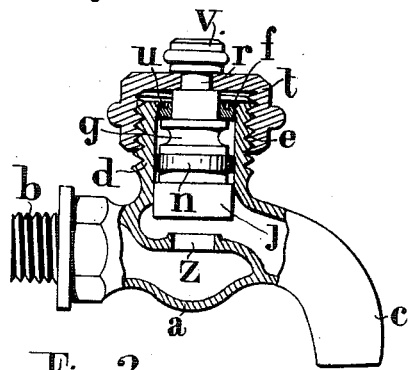

My present invention relates to a special and advantageous form of valve or cock of this type, wherein the spindle and valve slide without rotation, being actuated by a screw cap which has an internal screw thread screwing upon an external screw thread upon the barrel of the tap or cock, or which is provided with other means for causing the spindle of the valve to slide without rotating. Means are also provided for preventing the spindle from being drawn out during the rise of the valve, even when excessive force is applied to it, such means consisting preferably of a collar or ring which is screwed into the body and which cannot be affected by the turning on or off of the tap. A part of the spindle is provided with a shoulder coming upon the before mentioned collar or ring for the purpose of preventing the spindle being screwed out, and the spindle after passing through the collar or ring is reduced in diameter to pass through the screw cap and is fitted with a nut and washer or other secure stud or head sufficiently larger than the hole in the cap. And in order that my said invention may be better understood I will now proceed to describe the same with reference to the drawing accompanying this specification, in which;

Figure 1 is a vertical section of one form of tap closed; Fig. 2 is a part vertical section with the tap open.

The same letters of reference are employed to denote the same parts in both the views.

The tap consists of the usual body $a$ provided with a screwed connection $b$ for attachment to the supply pipe, and the usual outlet nozzle $c$. The body is formed with a cylinder $d$ furnished on the outside with a coarse thread $e$ and on the inside with another thread $f$.

$g$ is a spindle which is provided at the bottom with a screw thread $h$, on to which screws a flanged ring $j$ by means of the inturned flange of which a pad $k$ of rubber or other material is held in position at the bottom of the said spindle $g$. At some distance above the thread $h$ there is formed on the spindle $g$ a shoulder $m$, and an annular abutment $p$ forming an annular recess for the reception of a packing ring $n$ of rubber or other suitable material, which comes into close contact with the inner surface of the cylindrical chamber $d$. Above the abutment $p$ the spindle is stepped so as to reduce it slightly in diameter and a portion of it $r$ is left plain, above which portion $r$ the spindle $g$ is again provided with a screw threaded portion $s$. $t$ is a cap furnished with a milled edge and with an internal screw thread corresponding to the thread $e$ on the cylinder $d$, $u$ is a collar provided with an external screw thread corresponding to the thread $f$ on the inside of the chamber $d$. This collar is of sufficient size to allow the portion of the spindle below the plain portion $r$ to pass through, the spindle being prevented from being drawn out of the chamber by a step formed thereon above the abutment $p$.

When the cap $t$ is in position, that is when it is screwed down taking with it the spindle $g$, a screw cap $v$ is screwed tightly on to the top of the spindle $g$ engaging with the screw $s$. This cap $v$ may if desired be further secured by being pinned through. The body $a$ is cast with a bridge provided with a central hole $z$ which bridge is furnished with a seating for the cushion $k$ to rest upon when the spindle is lowered.

The action is as follows:—To turn the water on the cap $t$ is rotated and it rises, bearing against the underside of the cap $v$ and drawing up by means of this cap the spindle $g$. Owing to the friction of the packing-ring $n$ against the inner surface of the chamber $d$ the whole spindle arrangement does not rotate and may be raised if required until the step on the spindle $g$ comes against the underside of the collar $u$. By turning the cap $t$ in the reverse direction the valve is brought back on its seating.

It will be understood that I do not wish to confine myself to the particular construction of the various parts or the particular arrangement of threads and the like herein described and shown on the drawing, for instance, in place of or in addition to using a soft pad at the bottom of the sliding spindle or member I may provide the bridge with a soft seating, or instead of a soft pad, such as rubber, for the valve at the bottom of the sliding spindle, I may provide one faced with metal or other hard material and having a resilient backing or a metal spring. Again instead of providing a rubber packing ring such as that described and shown in the accompanying drawing, I may furnish any other suitable means for securing a fluid-tight joint, for instance, a cup leather held by a flange or washer on the spindle $g$ above the shoulder $m$.

For such purposes as valves for drinking fountains or where automatic closing of the cap is required or desirable, I make the chamber $d$ horizontal, with a cap to turn in a vertical plane and provide it with a weighted lever, which has to be lifted when turning the water on and falls of its own weight when the lever is released and turns the water off. This requires much less effort or strength than pressing the knob of the usual fountain valves closed by springs or the pressure of the water behind the spindles.

What I claim is:—

1. In a cock the combination with a body portion comprising an inlet, outlet, valve chamber and cylindrical head, of a non-rotatable reciprocating spindle provided with a packing ring between its outer surface and the inner bore of said cylindrical head, said spindle being provided at one end with a valve facing and at its other end with a cylindrical reduced portion having a part of its exterior surface smooth and its end screw threaded, a cap apertured to receive said reduced portion and threaded to engage corresponding threads on the exterior of said cylindrical head, and a second cap internally screw threaded to engage the screw threads on the end of said reduced portion of the spindle, substantially as described.

2. In a cock the combination with an inlet, an outlet, a valve chamber with a valve seat therein and a hollow cylindrical head, of a non-rotatable reciprocating spindle provided with an annular recess, a packing ring within said annular recess and disposed between said spindle and the bore of said cylindrical head, a clamping ring threaded to the lower portion of said spindle, a valve seating secured at the lower end of said spindle by said clamping ring, said spindle at its upper end being somewhat reduced to form a shoulder and further reduced to form a neck screw threaded at its end, a ring threaded within the top of said cylindrical head and bored to receive said first-mentioned reduced portion of said spindle, a cap threaded to the exterior of said cylindrical head and apertured to receive the neck portion of said spindle, and a second cap internally screw threaded and secured to the screw threaded end of said spindle, substantially as described.

In testimony whereof, I affix my signature, in presence of two witnesses.

JAMES THOMAS GARRATT.

Witnesses:
A. E. VIDAL,
S. MONYAN.

---

Copies of this patent may be obtained for five cents each, by addressing the "Commissioner of Patents, Washington, D. C."